US012142840B2

(12) United States Patent
Hankui et al.

(10) Patent No.: US 12,142,840 B2
(45) Date of Patent: Nov. 12, 2024

(54) ANTENNA DEVICE

(71) Applicant: JAPAN AVIATION ELECTRONICS INDUSTRY, LIMITED, Tokyo (JP)

(72) Inventors: Eiji Hankui, Tokyo (JP); Keishi Kosaka, Tokyo (JP); Hiroshi Toyao, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 122 days.

(21) Appl. No.: 17/972,964

(22) Filed: Oct. 25, 2022

(65) Prior Publication Data

US 2023/0178903 A1 Jun. 8, 2023

(30) Foreign Application Priority Data

Dec. 6, 2021 (JP) ................................ 2021-197750

(51) Int. Cl.
*H01Q 21/26* (2006.01)
*H01Q 25/00* (2006.01)

(52) U.S. Cl.
CPC ........... *H01Q 21/26* (2013.01); *H01Q 25/001* (2013.01)

(58) Field of Classification Search
CPC ........ H01Q 1/521; H01Q 1/523; H01Q 15/14; H01Q 19/108; H01Q 21/00; H01Q 21/061; H01Q 21/205; H01Q 21/24; H01Q 21/26; H01Q 25/001
See application file for complete search history.

(56) References Cited

U.S. PATENT DOCUMENTS 7,352,328 B2 4/2008 Moon et al.
2015/0214629 A1 7/2015 Hagiwara et al.

FOREIGN PATENT DOCUMENTS

CN 203232959 U 10/2013
CN 103606757 A 2/2014
CN 103887613 A * 6/2014 ............ H01Q 21/00
(Continued)

OTHER PUBLICATIONS

Taiwanese Office Action (and an English language translation thereof) dated Oct. 25, 2023, issued in counterpart Taiwanese Application No. 111140400.
(Continued)

*Primary Examiner* — Hoang V Nguyen
(74) *Attorney, Agent, or Firm* — Holtz, Holtz & Volek PC

(57) ABSTRACT

An antenna device comprises a plurality of antennas. The antennas include first antennas which form a first array and second antennas which form a second array. The first antennas include two first predetermined antennas arranged along a first line. A longitudinal direction of one of the first predetermined antennas and another longitudinal direction of a remaining one of the first predetermined antennas intersect with each other and define a horizontal plane. Each first antenna mainly radiates a horizontally polarized wave which is in parallel to the horizontal plane. Each second antenna mainly radiates a vertically polarized wave which is perpendicular to the horizontal plane. The second antennas include two second predetermined antennas arranged along a second line. When the first and second lines are projected onto the horizontal plane along a direction perpendicular to the horizontal plane, the first and second lines intersect with each other.

11 Claims, 8 Drawing Sheets

(56) References Cited

FOREIGN PATENT DOCUMENTS

| | | | |
|---|---|---|---|
| CN | 106450797 | A | 2/2017 |
| CN | 109560391 | A | 4/2019 |
| JP | H06260835 | A | 9/1994 |
| JP | H070193411 | A | 7/1995 |
| JP | 2007097167 | A | 4/2007 |
| KR | 20100019788 | A | 2/2010 |

OTHER PUBLICATIONS

Extended European Search Report (EESR) dated Apr. 12, 2023, issued in counterpart European Application No. 22203702.0.

Korean Office Action (and an English language translation thereof) dated Jan. 18, 2024, issued in counterpart Korean Application No. 10-2022-0142013.

* cited by examiner

ANTENNA DEVICE

CROSS REFERENCE TO RELATED APPLICATIONS

This application is based on and claims priority under 35 U.S.C. § 119 to Japanese Patent Application No. JP 2021-197750 filed Dec. 6, 2021, the content of which is incorporated herein in its entirety by reference.

BACKGROUND OF THE INVENTION

This invention relates to an antenna device comprising a plurality of antennas.

For example, this type of antenna device is disclosed in JP H06-260835 (Patent Document 1), the content of which is incorporated herein by reference.

As shown in FIG. 14, Patent Document 1 discloses an antenna device 90 comprising a plurality of dipole antennas 92. The dipole antennas 92 are divided into a plurality of antenna groups 94 and a plurality of antenna groups 96. The antenna groups 94 and the antenna groups 96 are arranged on a horizontal plane 91. As described above, the antenna device 90 comprises the antenna groups 94 and the antenna groups 96.

As can be seen from the arrangement of the dipole antennas 92 shown in FIG. 14, each of the dipole antennas 92 is adapted to a polarized wave whose electric field oscillates in parallel to the horizontal surface 91. In detail, each of the dipole antennas 92 of the antenna groups 96 is adapted to a first horizontally polarized wave whose electric field oscillates in a lateral direction of FIG. 14. This first horizontally polarized wave is referred to as "horizontally polarized wave" in Patent Document 1. Each of the dipole antennas 92 of the antenna groups 94 is adapted to a second horizontally polarized wave whose electric field oscillates in a vertical direction of FIG. 14. This second horizontally polarized wave is referred to as "vertically polarized wave" in Patent Document 1. The antenna groups 94 and the antenna groups 96 are alternately arranged. According to this arrangement, interference between the first horizontally polarized wave and the second horizontally polarized wave can be reduced, and thereby good isolation characteristics can be obtained. Thus, according to the technique of Patent Document 1, good isolation characteristics can be obtained in the antenna device 90 which sends and receives two horizontally polarized waves oscillating in two directions, respectively, which are in parallel to the horizontal plane and are perpendicular to each other.

Improvement of isolation characteristics is also required in an antenna devise sending and receiving two types of polarized waves, i.e., a horizontally polarized wave whose electric field oscillates in a direction in parallel to a horizontal plane and a vertically polarized wave whose electric field oscillates in another direction perpendicular to the horizontal plane.

SUMMARY OF THE INVENTION

It is therefore an object of the present invention to provide an antenna device whose isolation characteristics can be improved for two types of polarized waves comprising a horizontally polarized wave and a vertically polarized wave.

An aspect of the present invention provides an antenna device comprising a plurality of antennas. The antennas include a plurality of first antennas which form a first array and a plurality of second antennas which form a second array. The first antennas include two first predetermined antennas. A longitudinal direction of one of the first predetermined antennas and another longitudinal direction of a remaining one of the first predetermined antennas intersect with each other and define a horizontal plane. Each of the first antennas mainly radiates a horizontally polarized wave which is in parallel to the horizontal plane. Each of the second antennas mainly radiates a vertically polarized wave which is perpendicular to the horizontal plane. The second antennas include two second predetermined antennas. The two first predetermined antennas are arranged along a first line. The two second predetermined antennas are arranged along a second line. When the first line and the second line are projected onto the horizontal plane along a direction perpendicular to the horizontal plane, the first line and the second line intersect with each other.

According to an aspect of the present invention, the first line connects two of the first antennas, each of which radiates a horizontally polarized wave, to each other, and the second line connects two of the second antennas, each of which radiates a vertically polarized wave, to each other. When the first line and the second line are projected onto the horizontal plane along a direction perpendicular to the horizontal plane, the first line and the second line intersect with each other. In other words, two antennas which radiate the horizontally polarized waves are arranged to intersect with two antennas which radiate the vertically polarized waves. This arrangement is effective to prevent each of the antennas from receiving radio waves radiated from the other antennas. As a result, radio wave interference (electromagnetic coupling) between two antennas can be reduced, and thereby good isolation characteristics can be obtained. Thus, an aspect of the present invention provides an antenna device whose isolation characteristics can be improved for two types of polarized waves comprising a horizontally polarized wave and a vertically polarized wave.

An appreciation of the objectives of the present invention and a more complete understanding of its structure may be had by studying the following description of the preferred embodiment and by referring to the accompanying drawings.

Figure 1:
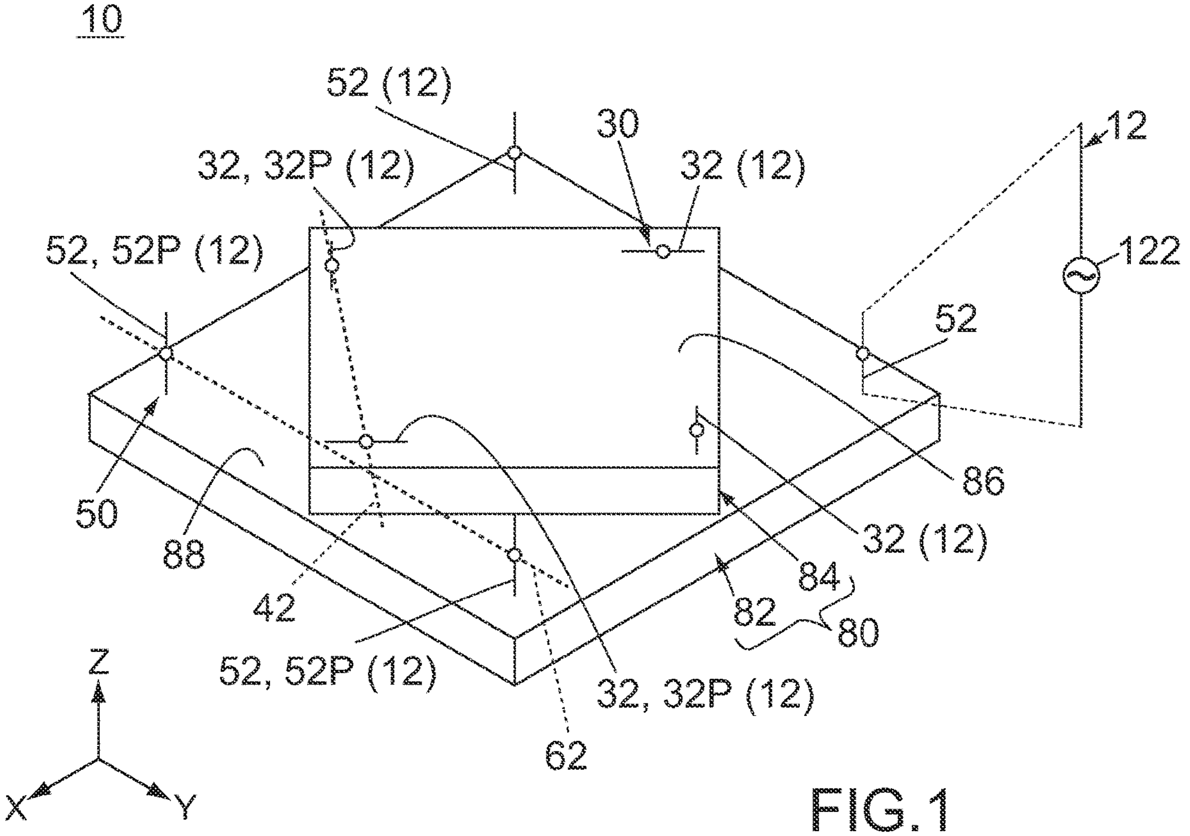
FIG. 1 is a perspective view showing an antenna device according to an embodiment of the present invention, wherein the shape of each of antennas is schematically illustrated.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
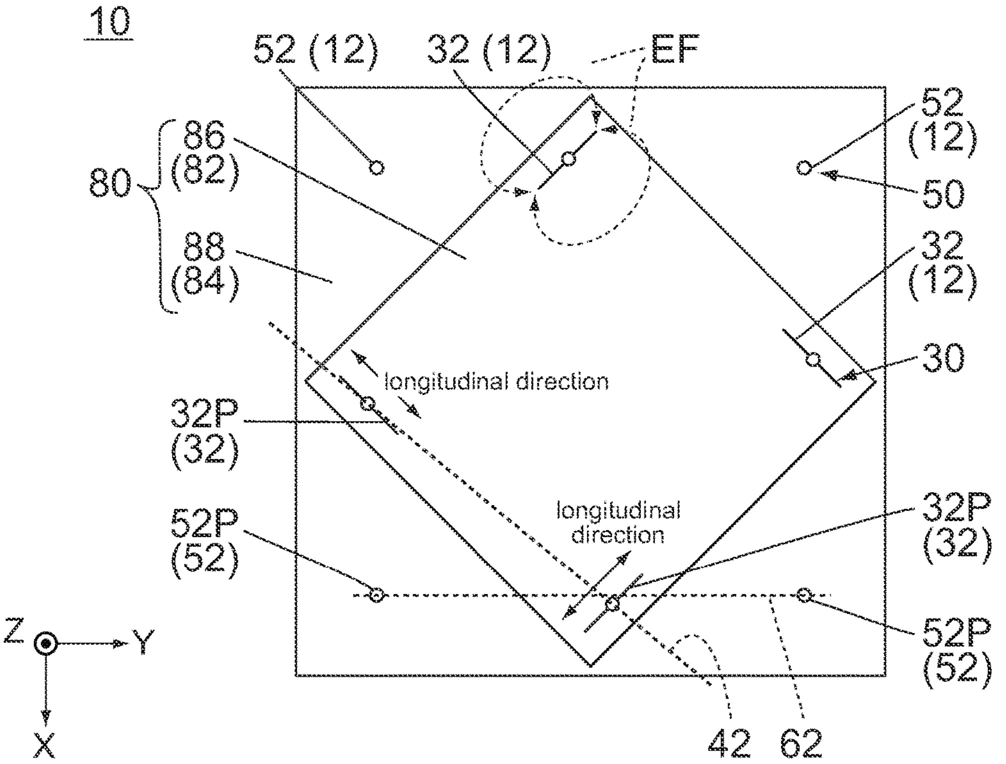
FIG. 2 is a plan view showing the antenna device of FIG. 1.
Figure 4:
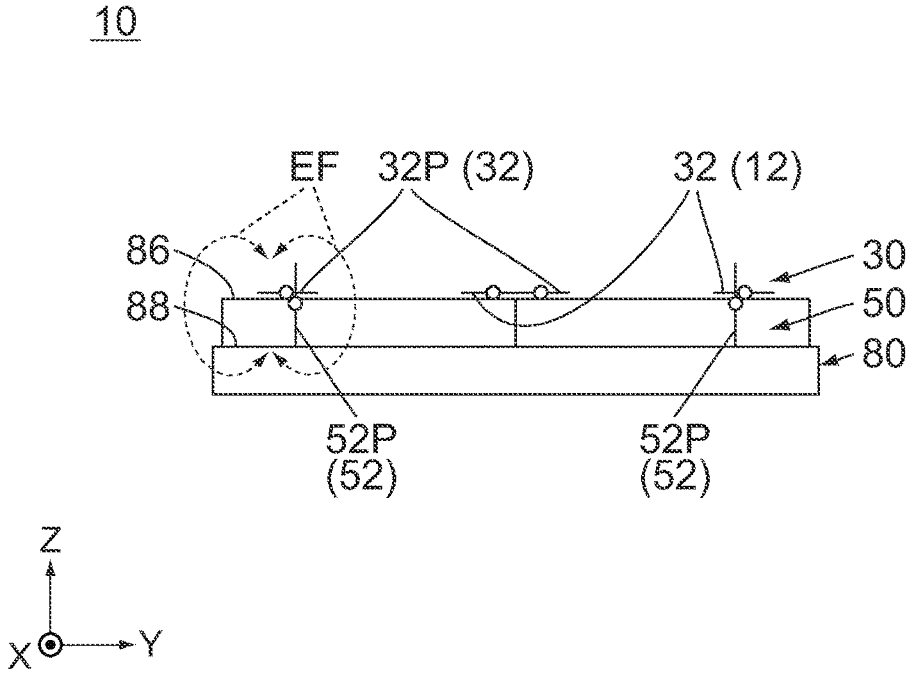
FIG. 4 is a front view showing the antenna device of FIG. 1.

Referring to FIGS. 1, 2 and 4, an antenna device 10 according to an embodiment of the present invention comprises a plurality of antennas 12 and a support member 80 made of insulator. For example, the antenna device 10 of the present embodiment is incorporated and used in a wireless communication device (not shown) such as a wireless local area network (LAN) device.

The antenna device 10 of the present embodiment comprises only the antennas 12 and the support member 80. However, the present invention is not limited thereto. For example, the antenna device 10 may further comprise another member in addition to the antennas 12 and the support member 80. Instead, the support member 80 may be provided as necessary.

As shown in FIG. 1, the support member 80 of the present embodiment has a base portion 82 and a projecting portion 84. Each of the base portion 82 and the projecting portion 84 has a rectangular shape in a horizontal plane (XY-plane) defined by a front-rear direction and a left-right direction. The projecting portion 84 is located at the middle of the base portion 82 in the horizontal plane and projects upward from the base portion 82 in an upper-lower direction perpendicular to the horizontal plane.

The front-rear direction of the present embodiment is the X-direction. In the present embodiment, "forward" means the positive X-direction, and "rearward" means the negative X-direction. The left-right direction of the present embodiment is the Y-direction. In the present embodiment, "rightward" means the positive Y-direction, and "leftward" means the negative Y-direction. The upper-lower direction of the present embodiment is the Z-direction. In the present embodiment, "upward" means the positive Z-direction, and "downward" means the negative Z-direction.

The projecting portion 84 has a first support portion 86. The first support portion 86 is an upper surface of the projecting portion 84. The base portion 82 has a second support portion 88. The second support portion 88 is an upper surface of the base portion 82. Each of the first support portion 86 and the second support portion 88 of the present embodiment is a flat surface which is in parallel to the horizontal plane and has no projection and no depression. However, the present invention is not limited thereto. For example, each of the first support portion 86 and the second support portion 88 may be formed with projections and/or depressions. Each of the first support portion 86 and the second support portion 88 may be a flat surface formed with steps or may be a sloped surface formed with steps. Instead, each of the first support portion 86 and the second support portion 88 may be a curved surface which is in parallel to the horizontal plane as a whole.

The antennas 12 of the present embodiment have linear shapes same as each other. More specifically, each of the antennas 12 is a dipole antenna. Each of the antennas 12 has a feeding point 122. The feeding point 122 of each of the antennas 12 is connected to a transceiver (not shown) via a feeding line (not shown). Each of the antennas 12 sends radio waves based on signals supplied from the transceiver via the feeding line and transmits signals based on received radio waves to the transceiver via the feeding line.

As described above, each of the antennas 12 of the present embodiment is a rod-dipole antenna having a linear shape. However, the present invention is not limited thereto. For example, each of the antennas 12 may be an inverted-L antenna formed of linear parts or may be an inverted-F antenna formed of linear parts. Each of the antennas 12 may be a multi-pole antenna which has a plurality of rod portions. Instead, each of the antennas 12 may be a patch antenna having a planar shape or may be a planar inverted-F antenna.

The antennas 12 comprises a plurality of first antennas 32 which form a first array 30 and a plurality of second antennas 52 which form a second array 50. The first array 30 is formed of all the first antennas 32 included in the antennas 12. The second array 50 is formed of all the second antennas 52 included in the antennas 12. The first array 30 of the present embodiment includes four first antennas 32. The second array 50 of the present embodiment includes four second antennas 52. However, the present invention is not limited thereto. For example, the first array 30 should include two or more first antennas 32. The second array 50 should include two or more second antennas 52. Thus, the number of the first antennas 32 may be two, and the number of the second antennas 52 may be two. The number of the first antennas 32 may be five or more, and the number of the second antennas 52 may be five or more.

Referring to FIGS. 1, 2 and 4, the first array 30 of the present embodiment is arranged on the first support portion 86 of the support member 80. More specifically, each of the first antennas 32 is located on the first support portion 86 and extends along the first support portion 86. Each of the thus-arranged first antennas 32 has a longitudinal direction which extends in parallel to the horizontal plane. Referring to FIG. 2, each of the thus-arranged first antennas 32 can send and receive a horizontally polarized wave whose electric field EF oscillates in a direction in parallel to the horizontal plane. In other words, each of the first antennas 32 mainly radiates the horizontally polarized wave which is in parallel to the horizontal plane.

Referring to FIGS. 1, 2 and 4, the second array 50 of the present embodiment is arranged on the second support portion 88 of the support member 80. More specifically, each of the second antennas 52 is located on the second support portion 88 and extends upward from the second support portion 88. Each of the thus-arranged second antennas 52 has a longitudinal direction which extends along the upper-lower direction. Referring to FIG. 4, each of the thus-arranged second antennas 52 can send and receive a vertically polarized wave whose electric field EF oscillates in a direction perpendicular to the horizontal plane. In other words, each of the second antennas 52 mainly radiates the vertically polarized wave which is perpendicular to the horizontal plane.

Since each of the antennas 12 of the present embodiment has a linear shape, its longitudinal direction is a direction along which the antenna 12 extends. In an instance where each of the antennas 12 has a plurality of rod portions or a planarly shape, an imaginary rectangle which is circumscribed about the antenna 12 can be defined, and a direction along which a long side of this imaginary rectangle extends may be defined as a longitudinal direction.

Referring to FIGS. 1 and 4, all the first antennas 32 of the present embodiment are supported by a single portion, i.e., the first support portion 86. The thus-supported first antennas 32 are located on a plane which is common to them and is in parallel to the horizontal plane. Each of the second antennas 52 of the present embodiment is supported by the one second support portion 88. Lower ends of the thus-supported second antennas 52 are located on a plane which is common to them and is in parallel to the horizontal plane.

However, the present invention is not limited thereto. For example, the first antennas 32 may be supported by respective support portions different from each other. The second antennas 52 may be supported by respective support portions different from each other. More specifically, the first antennas 32 and the second antennas 52 may be supported by eight support members, respectively, instead of the single support member 80. The eight support members may be separated from each other. The first antennas 32 may be located at positions different from each other in the upper-lower direction. The lower ends of the second antennas 52 may be located at positions different from each other in the upper-lower direction.

Referring to FIGS. 1, 2 and 4, the first antennas 32 include two first predetermined antennas 32P. The longitudinal direction of one of the first predetermined antennas 32P and the longitudinal direction of a remaining one of the first predetermined antennas 32P intersect with each other and define the horizontal plane.

In detail, if the two first predetermined antennas 32P of the present embodiment are made longer along their longitudinal directions, respectively, they intersect with each other at a right angle in a plane which is common to them and is in parallel to the horizontal plane. However, the present invention is not limited thereto. For example, if the two first predetermined antennas 32P are made longer along their longitudinal directions, respectively, they may obliquely intersect with each other in a plane which is common to them and is in parallel to the horizontal plane. Positions of the two first predetermined antennas 32P in the upper-lower direction may be different from each other. In this instance, the two first predetermined antennas 32P may extend along skew lines, respectively. The longitudinal directions of the two first predetermined antennas 32P may intersect with each other in a predetermined plane which intersect with the horizontal plane of the present embodiment. In this instance, this predetermined plane should be defined as the horizontal plane instead of the horizontal plane of the present embodiment.

The second antennas 52 include two second predetermined antennas 52P. The longitudinal directions of the two second predetermined antennas 52P of the present embodiment extend in parallel to each other along the upper-lower direction. However, the present invention is not limited thereto. For example, the longitudinal directions of the two second predetermined antennas 52P may intersect with each other when seen along the horizontal plane.

Referring to FIGS. 1 and 2, the two first predetermined antennas 32P are arranged along a first line 42. The two second predetermined antennas 52P are arranged along a second line 62. The first line 42 of the present embodiment extends through the feeding points 122 of the two first predetermined antennas 32P. The second line 62 of the present embodiment extends through the feeding points 122 of the two second predetermined antennas 52P. However, the present invention is not limited thereto. For example, in an instance where each of the first antennas 32 has a plurality of rod portions or a planarly shape, a line, which passes through the geometric center of each of figures obtained by projecting the two first predetermined antennas 32P onto the horizontal plane along the upper-lower direction, may be defined as the first line 42. Similarly, a line, which passes through the geometric center of each of projected figures obtained by projecting the two second predetermined antennas 52P onto the horizontal plane along the upper-lower direction, may be defined as the second line 62.

Each of the first line 42 and the second line 62 of the present embodiment extends in parallel to the horizontal plane. However, the present invention is not limited thereto. For example, each of the first line 42 and the second line 62 may intersect with the horizontal plane.

Referring to FIG. 2, when the first line 42 and the second line 62 are projected onto the horizontal plane along the upper-lower direction perpendicular to the horizontal plane, the first line 42 and the second line 62 intersect with each other.

Thus, when the first line 42, which connects two of the first antennas 32 each radiating the horizontally polarized wave to each other, and the second line 62, which connects two of the second antennas 52 each radiating the vertically polarized wave to each other, are projected onto the horizontal plane along a direction perpendicular to the horizontal plane, the projected first line 42 and the projected second line 62 intersect with each other.

As described above, the two first predetermined antennas 32P, or two of the antennas 12 which radiate the horizontally polarized waves, are arranged so that the longitudinal directions thereof intersect with each other. In addition, the two first predetermined antennas 32P which radiate the horizontally polarized waves are arranged to intersect with the two second predetermined antennas 52P, or two of the antennas 12 which radiate the vertically polarized waves. Hereafter, the aforementioned arrangement is referred to as "intersection arrangement".

According to the aforementioned intersection arrangement, radio wave interference (electromagnetic coupling) between two of the first antennas 32 which radiate the horizontally polarized waves can be reduced. In addition, radio wave interference between the first antenna 32 which radiates the horizontally polarized wave and the second antenna 52 which radiates the vertically polarized wave can be reduced. As a result, good isolation characteristics can be obtained. As described above, according to the antenna device 10 of the present embodiment, isolation characteristics between the horizontally polarized waves can be improved, and isolation characteristics between the horizontally polarized wave and the vertically polarized wave can be improved. Thus, the present embodiment provides the antenna device 10 whose isolation characteristics can be improved for two types of polarized waves comprising the horizontally polarized wave and the vertically polarized wave.

According to the present embodiment, every two of the first antennas 32 adjacent to each other are in the intersection arrangement with respect to any two of the second antennas 52 adjacent to each other. In other words, every two of the first antennas 32 adjacent to each other can be defined as the two first predetermined antennas 32P. Two of the second antennas 52 which are in the intersection arrangement with respect to the first predetermined antennas 32P can be defined as the two second predetermined antennas 52P. According to the present embodiment, better isolation characteristics can be obtained. However, the present invention is not limited thereto. For example, only two of the first antennas 32 may be in the intersection arrangement with respect to only two of the second antennas 52. In other words, only two of the first antennas 32 may be the first predetermined antennas 32P, and only two of the second antennas 52 may be the second predetermined antennas 52P.

Figure 3:
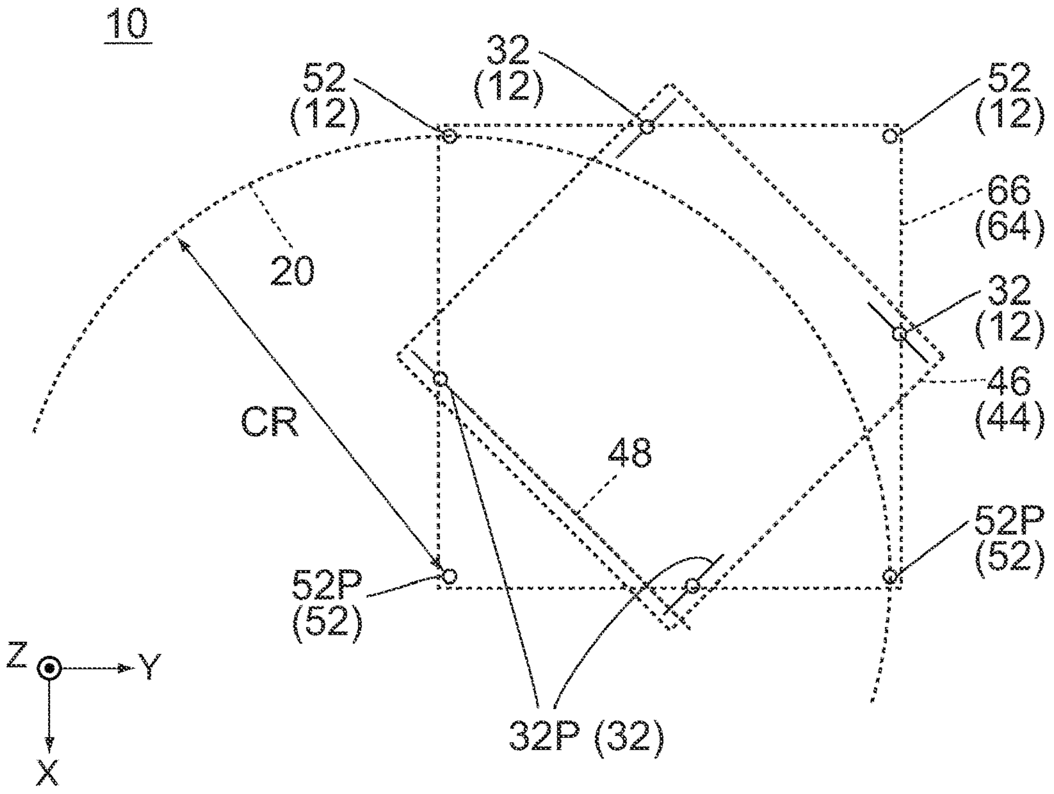
FIG. 3 is a plan view showing the arrangement of the antennas of the antenna device of FIG. 2.

Referring to FIG. 3, according to the present embodiment, when the two first predetermined antennas 32P and the two second predetermined antennas 52P are seen along the upper-lower direction perpendicular to the horizontal plane, the two first predetermined antennas 32P are located in an imaginary circle 20, one of the two second predetermined antennas 52P being located at the center of the imaginary circle 20, a remaining one of the two second predetermined antennas 52P being located on the circumference of the imaginary circle 20. In other words, a distance between the one of the second predetermined antennas 52P and each of the first predetermined antennas 32P is smaller than the radius CR of the imaginary circle 20. Thus, the two first predetermined antennas 32P are arranged to be close to the two second predetermined antennas 52P. Hereafter, this arrangement is referred to as “close arrangement”.

The first predetermined antennas 32P of the present embodiment are in the intersection arrangement with respect to the second predetermined antennas 52P. Therefore, even though the first predetermined antennas 32P are in the close arrangement with respect to the second predetermined antennas 52P, interference between the polarized wave of the first predetermined antenna 32P and the polarized wave of the second predetermined antenna 52P can be reduced, and thereby isolation characteristics can be improved. For example, even in an instance where a large number of the antennas 12 are arranged to be close to each other in a wireless communication device (not shown), radio wave interference between the antennas 12 arranged in the intersection arrangement can be reduced. However, the present invention is not limited thereto. For example, the two first predetermined antennas 32P may be located out of the imaginary circle 20.

Referring to FIG. 4, the first array 30 of the present embodiment is located above the second array 50. Because the first array 30 is apart from the second array 50 in the upper-lower direction, radio wave interference between the first antenna 32 which radiates the horizontally polarized wave and the second antenna 52 which radiates the vertically polarized wave can be further reduced. However, the present invention is not limited thereto. For example, the first array 30 may be located at a position same as that of the second array 50 in the upper-lower direction. Instead, the first array 30 may be located further above than the first array 30 illustrated in FIG. 4 or may be located below the second array 50.

Figure 5:
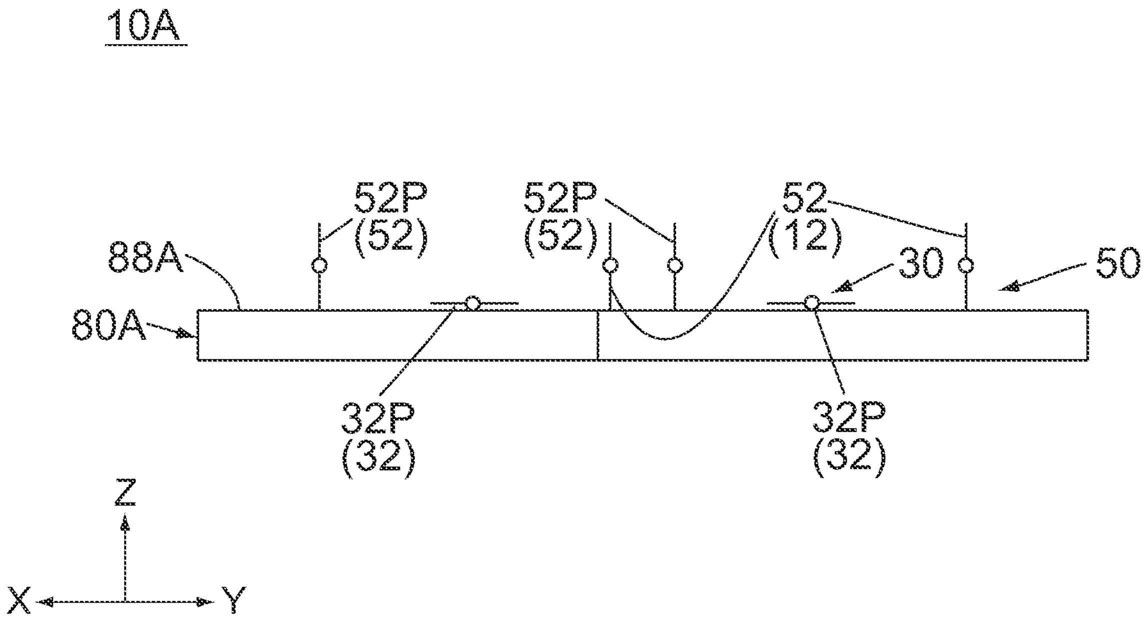
FIG. 5 is a side view showing a modification of the antenna device of FIG. 4.

More specifically explaining with comparison between FIG. 5 and FIG. 1, an illustrated antenna device 10A is a modification of the antenna device 10. The antenna device 10A has a structure similar to that of the antenna device 10 except for a support member 80A which is provided instead of the support member 80. The support member 80A has a support portion 88A. The support portion 88A is an upper surface of the support member 80A and is a flat surface which extends in parallel to the horizontal plane.

The antenna device 10A comprises the four first antennas 32 and the four second antennas 52 which are same as those of the antenna device 10. The arrangement of the first antennas 32 and the second antennas 52 in the horizontal plane is same as that of the antenna device 10. However, the first antennas 32 and the second antennas 52 are supported by the support portion 88A common to them. Thus, the first array 30 is located at a position same as that of the second array 50 in the upper-lower direction. According to the present modification, isolation characteristics can be improved similarly to the antenna device 10.

The aforementioned close arrangement of the first predetermined antennas 32P and the second predetermined antennas 52P can be explained from another viewpoint. Referring to FIG. 4 together with FIG. 2, one of the two first predetermined antennas 32P is located between the two second predetermined antennas 52P when seen along a direction which is perpendicular to the second line 62 and is in parallel to the horizontal plane. Referring to FIG. 5 together with FIG. 2, one of the two second predetermined antennas 52P is located between the two first predetermined antennas 32P when seen along a direction which is perpendicular to the first line 42 and is in parallel to the horizontal plane.

The first predetermined antennas 32P and the second predetermined antennas 52P of the present embodiment are arranged as described above. However, the present invention is not limited thereto. For example, the two first predetermined antennas 32P may be located between the two second predetermined antennas 52P when seen along a direction which is perpendicular to the second line 62 and is in parallel to the horizontal plane. The two second predetermined antennas 52P may be located between the two first predetermined antennas 32P when seen along a direction which is perpendicular to the first line 42 and is in parallel to the horizontal plane.

Referring to FIG. 1, the four first antennas 32 of the present embodiment are arranged on a plane in parallel to the horizontal plane. In other words, the first array 30 of the present embodiment includes the four first antennas 32 which are arranged on a plane in parallel to the horizontal plane. The four second antennas 52 of the present embodiment are arranged on a plane in parallel to the horizontal plane. In other words, the second array 50 of the present embodiment includes the four second antennas 52 which are arranged on a plane in parallel to the horizontal plane. However, the present invention is not limited thereto. For example, only three of the first antennas 32 may be arranged on a plane which is common to them and is in parallel to the horizontal plane, and only three of the second antennas 52 may be arranged on a plane which is common to them and is in parallel to the horizontal plane. Thus, at least one of the first array 30 and the second array 50 may include at least three of the antennas 12 which are arranged on a plane in parallel to the horizontal plane.

Hereafter, explanation from further various viewpoints will be made about an arrangement for improving isolation characteristics of the first antennas 32 and the second antennas 52 of the present embodiment.

Referring to FIG. 2, each of the first antennas 32, or each of the antennas 12 which form the first array 30 of the present embodiment, is located between some two of the second antennas 52 adjacent to each other, or some adjacent two of the antennas 12 which form the second array 50. For example, the front first antenna 32 is located between the front two second antennas 52. However, the present invention is not limited thereto. For example, each of the second antennas 52 included in the second array 50 may be located between some two of the first antennas 32 which are included in the first array 30 and are adjacent to each other. Thus, each of the antennas 12 of one of the first array 30 and the second array 50 may be located between two of the antennas 12 which are included in a remaining one of the first array 30 and the second array 50 and are adjacent to each other.

Referring to FIG. 3, according to the present embodiment, a predetermined line 48 which extends along the longitudinal direction of one of the two first predetermined antennas 32P intersects with a remaining one of the two first predetermined antennas 32P. However, the present invention is not limited thereto, but the predetermined line 48 may be apart from the remaining one of the two first predetermined antennas 32P to some extent.

According to the present embodiment, the number of the first antennas 32 is four, and the number of the second antennas 52 is four. The four first antennas 32 are arranged at four corners of an imaginary first rectangle 44, respectively. The imaginary first rectangle 44 is located on a plane in parallel to the horizontal plane. The four second antennas 52 are arranged at four corners of an imaginary second rectangle 64, respectively. The imaginary second rectangle 64 is located on a plane in parallel to the horizontal plane.

According to the present embodiment, when the first rectangle 44 and the second rectangle 64 are seen along the upper-lower direction, the position of the center of the first rectangle 44 in the horizontal plane is equal to the position of the center of the second rectangle 64 in the horizontal plane. Moreover, the first rectangle 44 is inclined with respect to the second rectangle 64 by a predetermined angle. Four vertexes of the first rectangle 44 are located out of the second rectangle 64, and four vertexes of the second rectangle 64 are located out of the first rectangle 44. As a result, each of the four sides 46 of the first rectangle 44 is nearer to two sides 66 among the four sides 66 of the second rectangle 64 than to remaining two sides 66 among the four sides 66 of the second rectangle 64. A direction along which each of the four sides 46 of the first rectangle 44 extends intersects with both of directions along which the nearer two sides 66 of the second rectangle 64 extend, respectively. According to the present embodiment, each of the four sides 46 of the first rectangle 44 intersects with both of the nearer two sides 66 among the four sides 66 of the second rectangle 64 which are nearer to this side 46 than the remaining two sides 66 of the second rectangle 64 are.

The first antennas 32 and the second antennas 52 of the present embodiment are arranged as described above. However, the present invention is not limited thereto. For example, when the first rectangle 44 and the second rectangle 64 are seen along the upper-lower direction, the first rectangle 44 may be located in the second rectangle 64, or the second rectangle 64 may be located in the first rectangle 44. The first rectangle 44 and the second rectangle 64 may overlap with each other.

The present embodiment can be further variously modified in addition to the already described modifications. Hereafter, explanation will be made about modifications of the present embodiment.

Figure 6:
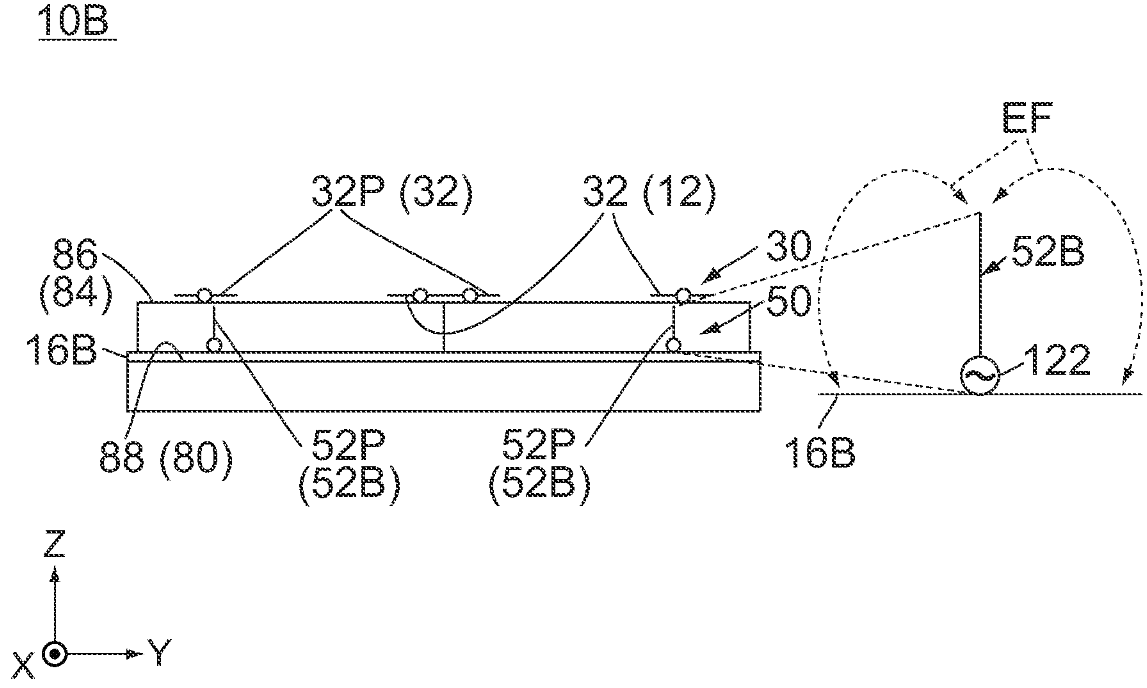
FIG. 6 is a front view showing another modification of the antenna device of FIG. 4.

Comparing FIG. 6 with FIG. 4, an antenna device 10B of the present modification comprises a reflection plate 16B which is not provided to the antenna device 10. The antenna device 10B comprises four second antennas 52B instead of the second antennas 52 of the antenna device 10. The antenna device 10B has a structure same as that of the antenna device 10 except for the aforementioned difference. However, the present invention is not limited thereto. For example, the support member 80 may be provided as necessary.

Referring to FIG. 6, the reflection plate 16B of the present modification is a flat plate made of metal. The reflection plate 16B is located on the second support portion 88 of the support member 80. The reflection plate 16B extends along the horizontal plane. Thus, the reflection plate 16B is arranged in parallel to the horizontal plane. In other words, the reflection plate 16B is arranged along the horizontal plane.

The second antennas 52B of the present modification have linear shapes same as each other. More specifically, each of the second antennas 52B is a monopole antenna. Each of the second antennas 52B has a feeding point 122. The lower ends of the feeding points 122 are connected to the reflection plate 16B. Each of the second antennas 52B are arranged on the reflection plate 16B and extend upward from the reflection plate 16B along the upper-lower direction. Thus, the longitudinal direction of each of the second antennas 52B extends along the upper-lower direction. Each of the second antennas 52B which is arranged on the reflection plate 16B made of metal as described above can send and receive the vertically polarized wave whose electric field EF oscillates in a direction perpendicular to the horizontal plane. In other words, each of the second antennas 52B mainly radiates the vertically polarized wave which is perpendicular to the horizontal plane.

Referring to FIG. 6 together with FIG. 1, the first antennas 32 and the second antennas 52B of the present modification are arranged similarly to the first antennas 32 and the second antennas 52 of the antenna device 10. The present modification provides the antenna device 10B whose isolation characteristics can be improved for two types of polarized waves comprising the horizontally polarized wave and the vertically polarized wave.

Referring to FIG. 6, each of the second antennas 52B of the present modification is wholly located between the first array 30 and the reflection plate 16B in the upper-lower direction perpendicular to the horizontal plane. The thus-arranged second array 50 of the present modification is nearer to the reflection plate 16B than the first array 30 is. This arrangement enables isolation characteristics to be improved. However, the present invention is not limited thereto. For example, a size of the projecting portion 84 in the upper-lower direction may be made small so that the antenna device 10B may be reduced in height. For example, the first array 30 may be arranged on an upper surface of the projecting portion 84 which is flush with an upper surface of the reflection plate 16B. Each of the second antennas 52B may be, at least in part, located between the first array 30 and the reflection plate 16B in a direction perpendicular to the horizontal plane.

Figure 9:
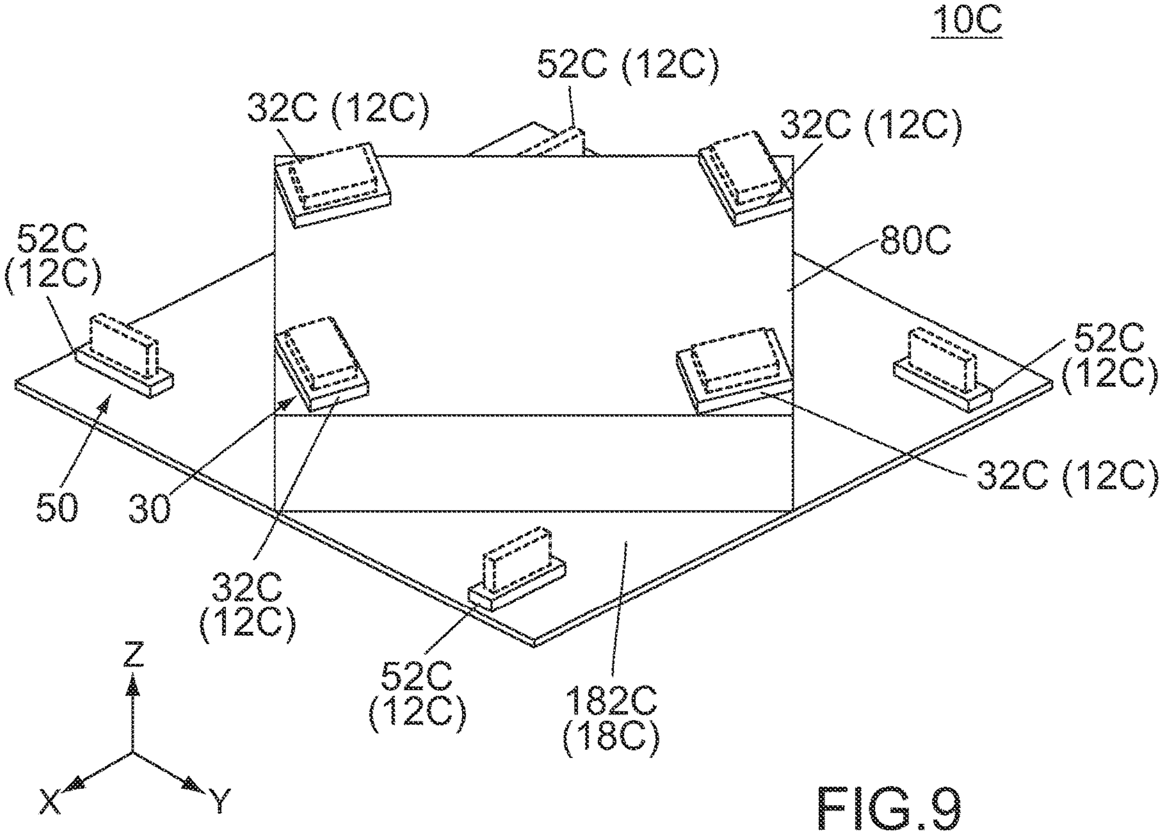
FIG. 9 is a perspective view showing a modification of the antenna device of FIG. 1, wherein outlines of first and second antennas are illustrated with dashed line.

Comparing FIG. 9 with FIG. 1, an antenna device 10C of another modification has members different from those of the antenna device 10. However, as described below, the antenna device 10C has a structure similar to that of the antenna device 10 and can be modified similarly to the antenna device 10.

Referring to FIG. 9, the antenna device 10C comprises a plurality of antennas 12C, a reflection plate 16C made of metal and a support member 80C made of insulator. It is sufficient that the reflection plate 16C is made of metal. For example, the reflection plate 16C may be a cut metal plate or may be a metal plate formed by die casting. Instead, the antenna device 10C may be provided with a board (not shown) which is as large as the illustrated reflection plate 16C. In this instance, this board may have a ground portion, and this ground portion may be used as the reflection plate 16C. The antennas 12C comprises a plurality of first antennas 32C which form the first array 30 and a plurality of second antennas 52C which form the second array 50. The reflection plate 16C extends along the horizontal plane. Thus, the reflection plate 16C is arranged in parallel to the horizontal plane. The support member 80C projects upward from the reflection plate 16C. The support member 80C has an upper surface which extends in parallel to the horizontal plane.

Each of the first antennas 32C and the second antennas 52C is arranged above the reflection plate 16C. Each of the second antennas 52C is arranged directly on the reflection plate 16C. In contrast, each of the first antennas 32C is arranged on an upper surface of the support member 80C. Thus, each of the first antennas 32C is arranged so as to be apart from the reflection plate 16C.

The antenna device 10C of the present modification comprises the aforementioned members. However, the present invention is not limited thereto. For example, the reflection plate 16C may be provided as necessary. Moreover, the reflection plate 16C may be provided on an area corresponding to the second antennas 52C.

All the first antennas 32C of the present modification are located on a plane which is common to them and is in parallel to the horizontal plane. All the second antennas 52C of the present modification are located on a plane which is common to them and is in parallel to the horizontal plane. However, the present invention is not limited thereto. For example, positions of the four first antennas 32C and the four second antennas 52C in the upper-lower direction may be different from each other. Each of the second antennas 52C may be, at least in part, located between the first array 30 and the reflection plate 16C in the upper-lower direction perpendicular to the horizontal plane.

Figure 7:
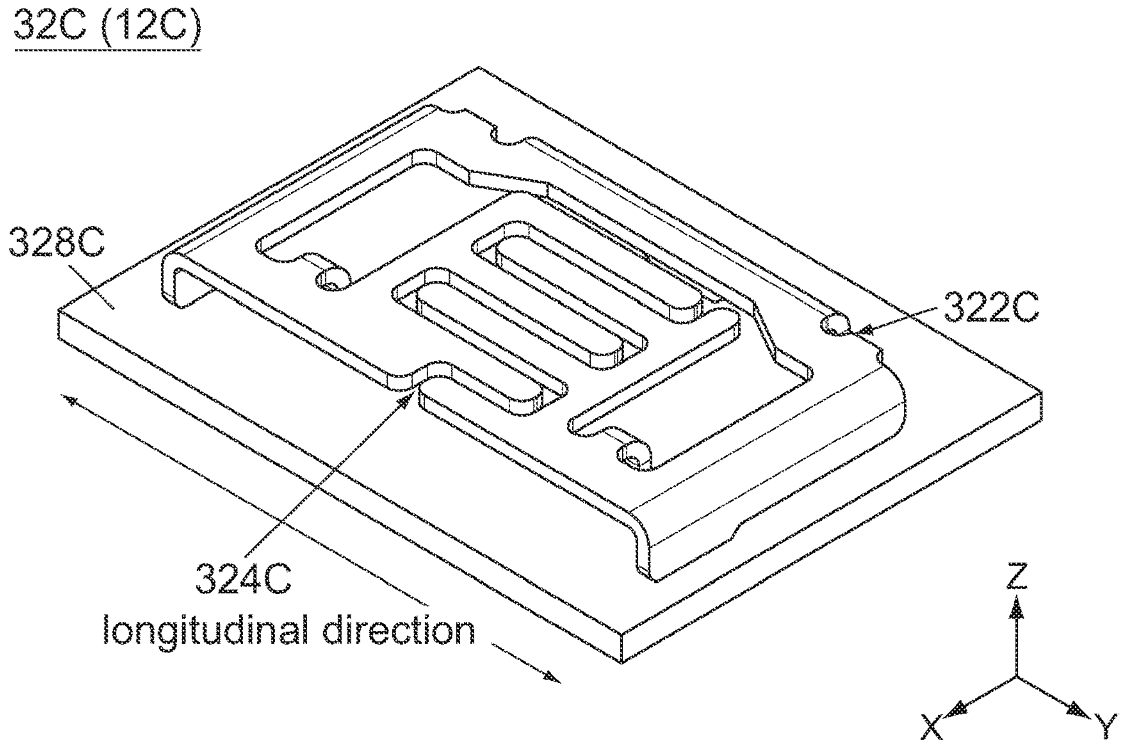
FIG. 7 is a perspective view showing a modification of a first antenna of FIG. 1.

Referring to FIG. 7, each of the first antennas 32C of the present modification is an antenna which has a split-ring resonance structure. Each of the first antennas 32C comprises a conductive portion 322C made of metal and a board 328C having a rectangular shape. The board 328C is made of material such as glass epoxy. The board 328C is formed with a ground portion (not shown) and patterns (not shown) each made of conductive metal such as copper. The conductive portion 322C is installed on the board 328C and is connected to the ground portion and the patterns.

The conductive portion 322C is formed with a split 324C having an interdigital structure. The thus-formed conductive portion 322C works as a split-ring resonator. Each of the conductive portions 322C is mounted on the board 328C so as to extend along the horizontal plane as a whole. For example, each of the first antennas 32C is connected to a transceiver (not shown) via a feeding line (not shown) provided on the board 328C. Each of the first antennas 32C arranged as described above mainly radiates the horizontally polarized wave which is in parallel to the horizontal plane.

When the first antenna 32C is seen along the upper-lower direction, the geometric center of the first antenna 32C is located in the vicinity of the center of the rectangular board 328C in the horizontal plane. The longitudinal directions of the first antenna 32C is a direction along which a long side of the board 328C extends. The longitudinal direction of the first antenna 32C illustrated in FIG. 7 extends along the left-right direction.

According to the first antenna 32C of the present modification, various components such as inductors, capacitors and registers can be installed to the board 328C. The impedance of the first antenna 32C can be adjusted by the thus-installed inductors, capacitors and registers. Thus, the present modification provides the first antenna 32C which is adjustable to have a predetermined impedance for a predetermined frequency as necessary.

Figure 8:
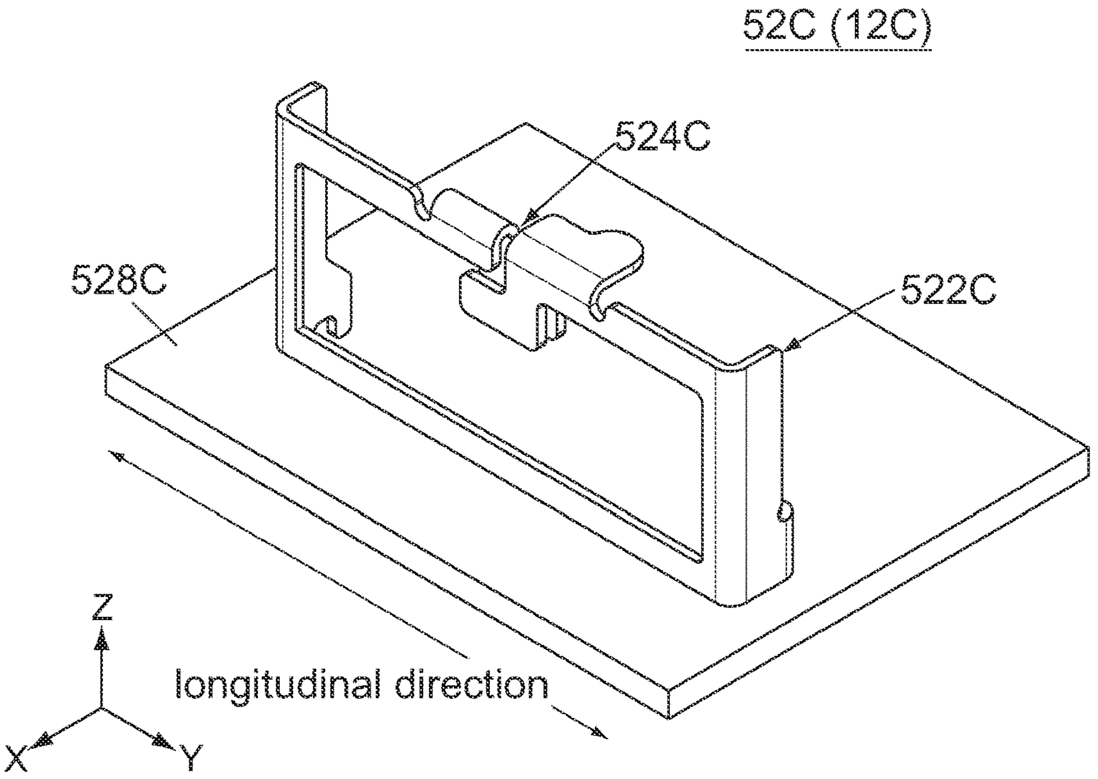
FIG. 8 is a perspective view showing a modification of a second antenna of FIG. 1.

Referring to FIG. 8, each of the second antennas 52C of the present modification is an antenna which has a split-ring resonance structure. Each of the second antennas 52C comprises a conductive portion 522C made of metal and a board 528C having a rectangular shape. The board 528C is made of material such as glass epoxy. The board 528C is formed with a ground portion (not shown) and patterns (not shown) each made of conductive metal such as copper. The conductive portion 522C is installed on the board 528C and is connected to the ground portion and the patterns. When each of the second antennas 52C is arranged on the reflection plate 16C (see FIG. 9), the ground portion of the board 528C is connected to the reflection plate 16C. However, the present invention is not limited thereto. For example, when a ground portion (not shown) of a board (not shown) is used as the reflection plate 16C as previously described, the conductive portion 522C may be mounted on this board and may be directly connected to the ground portion of the board.

The conductive portion 522C is formed with a split 524C. The thus-formed conductive portion 522C works as a split-ring resonator. Each of the conductive portions 522C is mounted on the board 528C so as to extend along a plane perpendicular to the horizontal plane as a whole. For example, each of the second antennas 52C is connected to a transceiver (not shown) via a feeding line (not shown) provided on the board 528C. Each of the second antennas 52C arranged as described above mainly radiates the vertically polarized wave which is perpendicular to the horizontal plane.

When the second antenna 52C is seen along the upper-lower direction, the geometric center of the second antenna 52C is located in the vicinity of the center of the rectangular board 528C in the horizontal plane. The longitudinal direction of the second antenna 52C is a direction along which a long side of the board 528C extends. The longitudinal direction of the second antenna 52C illustrated in FIG. 8 extends along the left-right direction.

According to the second antenna 52C of the present modification, various components such as inductors, capacitors and registers can be installed to the board 528C. The impedance of the second antenna 52C can be adjusted by the thus-installed inductors, capacitors and registers. Thus, the present modification provides the second antenna 52C which is adjustable to have a predetermined impedance for a predetermined frequency as necessary.

Referring to FIG. 7, an antenna similar to the first antenna 32C is disclosed in JP2020-145541A and WO2019/198588A1, the contents of which are incorporated herein their entirety by reference. Referring to FIG. 8, an antenna similar to the second antenna 52C is disclosed in Japanese Patent Application No. JP 2021-004233 filed Jan. 14, 2021, the content of which is incorporated herein its entirety by reference.

Figure 10:
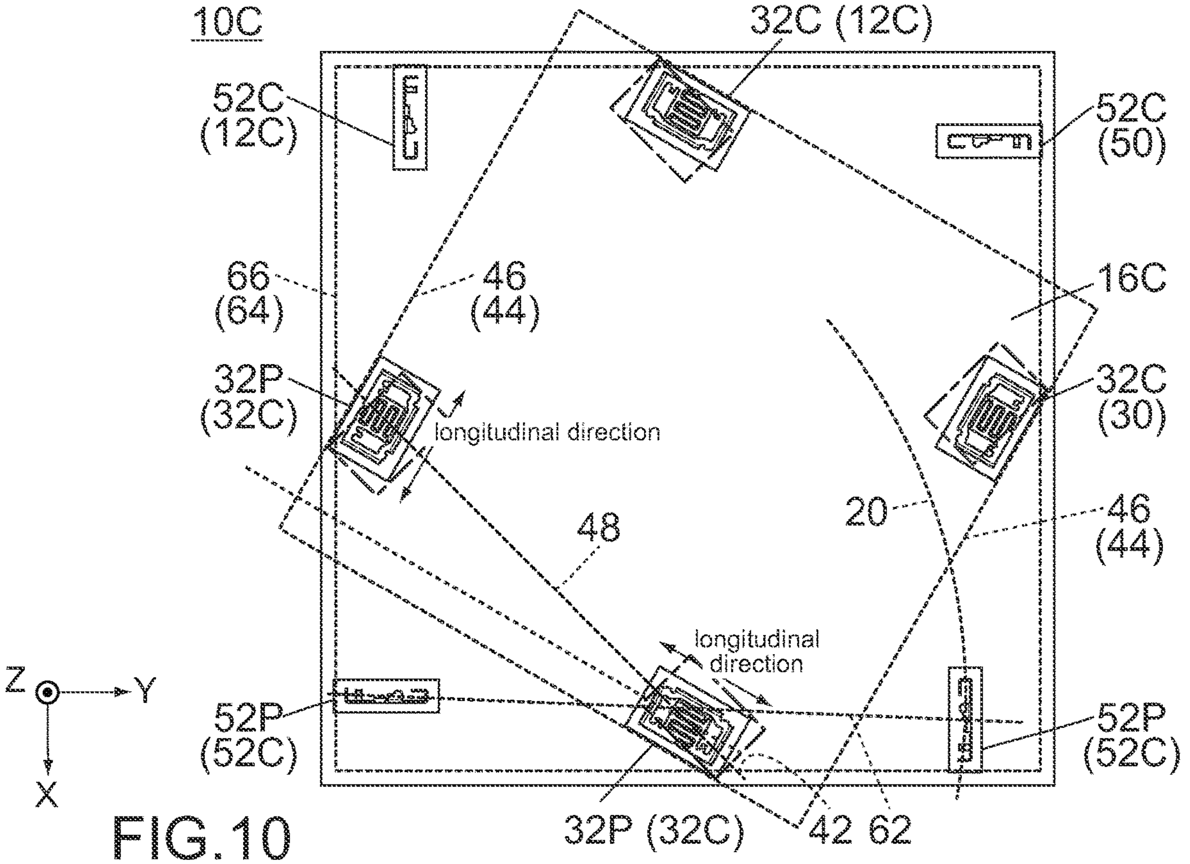
FIG. 10 is a plan view showing the antenna device of FIG. 9, wherein a support member is not illustrated.

Referring to FIG. 10, the first antennas 32C of the antenna device 10C include two first predetermined antennas 32P. The second antennas 52C of the antenna device 10C include two second predetermined antennas 52P. The longitudinal direction of one of the first predetermined antennas 32P and the longitudinal direction of a remaining one of the first predetermined antennas 32P intersect with each other and define the horizontal plane.

The two first predetermined antennas 32P are arranged along the first line 42. The two second predetermined antennas 52P are arranged along the second line 62. When the first line 42 and the second line 62 are projected onto the horizontal plane along the upper-lower direction perpendicular to the horizontal plane, the first line 42 and the second line 62 intersect with each other. Thus, the first predetermined antennas 32P are in the intersection arrangement with respect to the second predetermined antennas 52P similarly to the antenna device 10 (see FIG. 1). The present modification provides the antenna device 10C whose isolation characteristics can be improved for two types of polarized waves comprising the horizontally polarized wave and the vertically polarized wave.

Referring to FIG. 10, the first antennas 32C of the present modification have shapes same as each other. The second antennas 52C of the present modification have shapes same as each other. Two of the first antennas 32C, which are adjacent to each other in the first array 30, are arranged to take postures different from each other. Two of the second antennas 52C, which are adjacent to each other in the second array 50, are arranged to take postures different from each other. In detail, two of the second antennas 52C adjacent to each other are arranged so that the longitudinal directions thereof intersect with each other.

The four first antennas 32C of the present modification are arranged so that corresponding parts thereof face directions which intersect with each other at an angle about 90°. Each of these corresponding parts of the four first antennas 32C is a rear end of the conductive portion 322C illustrated in FIG. 7. The four second antennas 52C of the present modification are arranged so that corresponding parts thereof face directions which intersect with each other at an angle about 90°. Each of these corresponding parts of the four second antennas 52C is a front surface of the conductive portion 522C illustrated in FIG. 8. The four first antennas 32C of the present modification are arranged to have a four-times symmetric shape as a whole in the horizontal plane. The second antennas 52C of the present modification are arranged to have a four-times symmetric shape as a whole in the horizontal plane.

According to the antenna device 10C of the present modification, radio wave interference among the antennas 12C can be further reduced. However, the present invention is not limited thereto. For example, the first antennas 32C may be arranged to take postures same as each other. The second antennas 52C may be arranged to take postures same as each other. The four first antennas 32C may be arranged so that corresponding portions thereof face directions which intersect with each other at a predetermined angle or may be arranged unsymmetrically in the horizontal plane. The second antennas 52C may be arranged so that corresponding portions thereof face directions which intersect with each other at a predetermined angle or may be arranged unsymmetrically in the horizontal plane.

The first antennas 32C including the first predetermined antennas 32P and the second antennas 52C including the second predetermined antennas 52P are arranged similarly to the antenna device 10 (see FIG. 1). The arrangement of the first antennas 32C and the second antennas 52C can be modified similarly to that of the antenna device 10. Hereafter, explanation will be made about the arrangement of the first antennas 32C and the second antennas 52C of the present modification.

As can be seen from FIG. 10, one of the two first predetermined antennas 32P is located between the two second predetermined antennas 52P when seen along a direction which is perpendicular to the second line 62 and is in parallel to the horizontal plane. One of the two second predetermined antennas 52P is located between the two first predetermined antennas 32P when seen along a direction which is perpendicular to the first line 42 and is in parallel to the horizontal plane.

When the two first predetermined antennas 32P and the two second predetermined antennas 52P are seen along the upper-lower direction perpendicular to the horizontal plane, the two first predetermined antennas 32P are located in an imaginary circle 20, one of the two second predetermined antennas 52P being located at the center of the imaginary circle 20, a remaining one of the two second predetermined antennas 52P being located on the circumference of the imaginary circle 20.

The first antennas 32C are arranged on a plane in parallel to the horizontal plane. The second antennas 52C are arranged on a plane in parallel to the horizontal plane. In other words, the first array 30 includes four of the antennas 12C, or the first antennas 32C, which are arranged on a plane in parallel to the horizontal plane. The second array 50 include four of the antennas 12C, or the second antennas 52C, which are arranged on a plane in parallel to the horizontal plane. Thus, at least one of the first array 30 and the second array 50 includes at least three of the antennas 12C which are arranged on a plane in parallel to the horizontal plane.

Each of the first antennas 32C, or each of the antennas 12C which form the first array 30, is located between some two of the second antennas 52C adjacent to each other, or some adjacent two of antennas 12C which form the second array 50. Thus, each of the antennas 12C of one of the first array 30 and the second array 50 is located between two of the antennas 12C which are included in a remaining one of the first array 30 and the second array 50 and are adjacent to each other.

According to the present modification, the predetermined line 48 which extends along the longitudinal direction of one of the two first predetermined antennas 32P is apart from a remaining one of the two first predetermined antennas 32P. However, the present invention is not limited thereto. For example, each of the first antennas 32C may be located at a position indicated by chain dotted lines of FIG. 10. In this instance, the predetermined line 48 intersects with a remaining one of the two first predetermined antennas 32P.

The number of the first antennas 32C is four, and the number of the second antennas 52C is four. The four first antennas 32C are located at four corners of the imaginary first rectangle 44, respectively. The imaginary first rectangle 44 is located on a plane in parallel to the horizontal plane. The first rectangle 44 is a rectangle which is circumscribed about the four first antennas 32C and does not equal to the outline of the support member 80C (see FIG. 9). The four second antennas 52C are located at four corners of the imaginary second rectangle 64, respectively. The imaginary second rectangle 64 is located on a plane in parallel to the horizontal plane. The second rectangle 64 is a rectangle which is circumscribed about the four second antennas 52C and does not equal to the outline of the reflection plate 16C. Each of the four sides 46 of the first rectangle 44 is nearer to two sides 66 among the four sides 66 than to remaining two sides 66 among four sides 66. A direction along which each of the four sides 46 of the first rectangle 44 extends intersects with both of directions along which the nearer two sides 66 extend, respectively.

Figure 11:
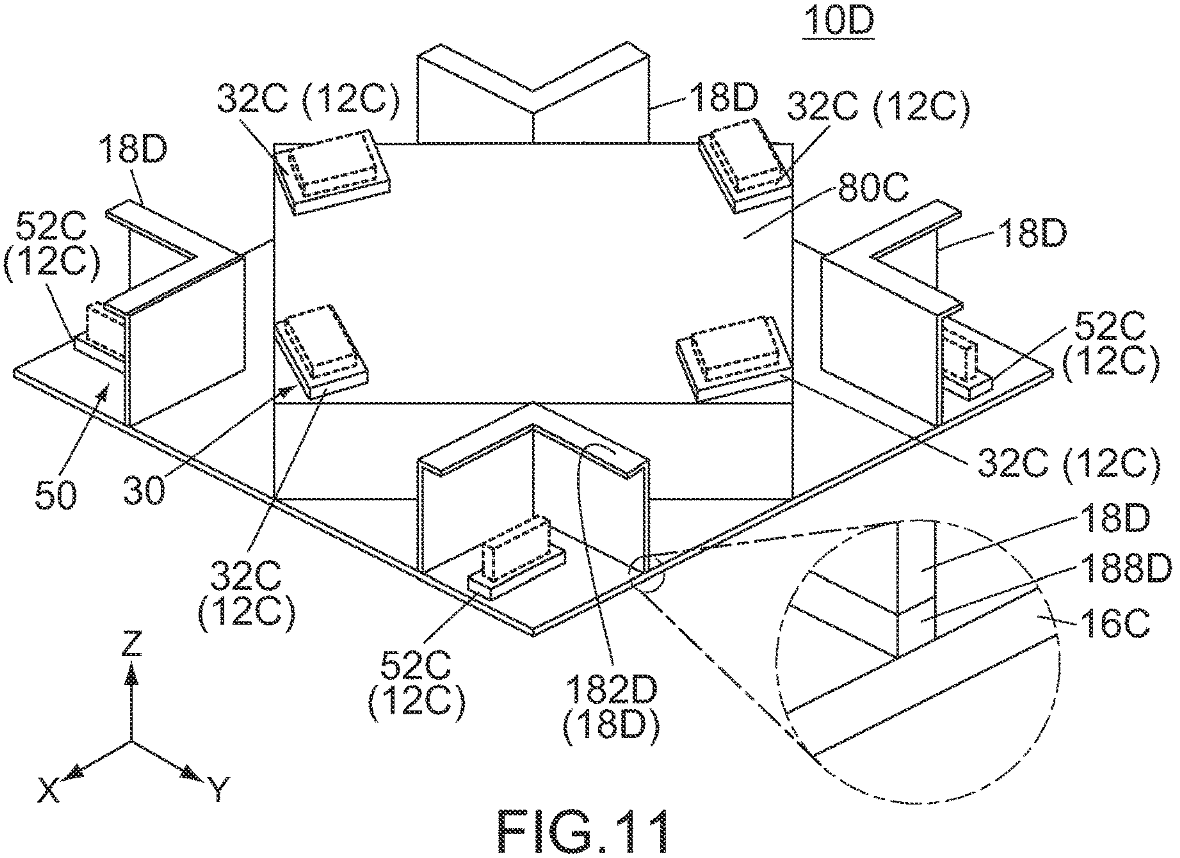
FIG. 11 is a perspective view showing a modification of the antenna device of FIG. 9.

Comparing FIG. 11 with FIG. 9, an antenna device 10D according to a modification of the antenna device 10C comprises a plurality of shield plates 18D which are not provided to the antenna device 10C. The antenna device 10D has a structure same as that of the antenna device 10C except for this difference.

The shield plates 18D of the present modification are provided so as to correspond to the first antennas 32C, respectively. Each of the shield plates 18D is a metal plate. Each of the shield plates 18D is connected to the reflection plate 16C. Each of the shield plates 18D is located between one of the first antennas 32C and the second antenna 52C which is nearest or close to the one of first antenna 32C. More specifically, each of the shield plates 18D is located between the corresponding first antenna 32C and the second antenna 52C which is nearest or close to the corresponding first antenna 32C. The thus-provided shield plates 18D enables isolation characteristics to be further improved.

The shield plates 18D of the present modification surround the second antennas 52C, respectively. The shield plates 18D are provided so as to locate the second antennas 52C in a hidden region on the reflection plate 16C. Each of the shield plates 18D is provided only on an upper surface of the reflection plate 16C. Each of the shield plates 18D extends upward from the reflection plate 16C. Each of the shield plates 18D has a protruding portion 182D. The protruding portion 182D is located at an upper end of the shield plate 18D and protrudes toward the second antenna 52C. Each of the shield plates 18D of the present modification has the aforementioned structure. However, the present invention is not limited thereto. For example, the structure of each of the shield plates 18D and the arrangement of the shield plates 18D can be modified as necessary. The antenna device 10D may comprise one or more of the shield plates 18D.

Each of the shield plates 18D of the present modification is directly fixed on the upper surface of the reflection plate 16C. However, the present invention is not limited thereto. For example, as shown in an enlarged view of FIG. 11, each of the shield plates 18D may be indirectly fixed on the upper surface of the reflection plate 16C via a gap member 188D made of insulator. In other words, a gap may be formed between each of the shield plates 18D and the reflection plate 16C in the upper-lower direction.

Figure 12:
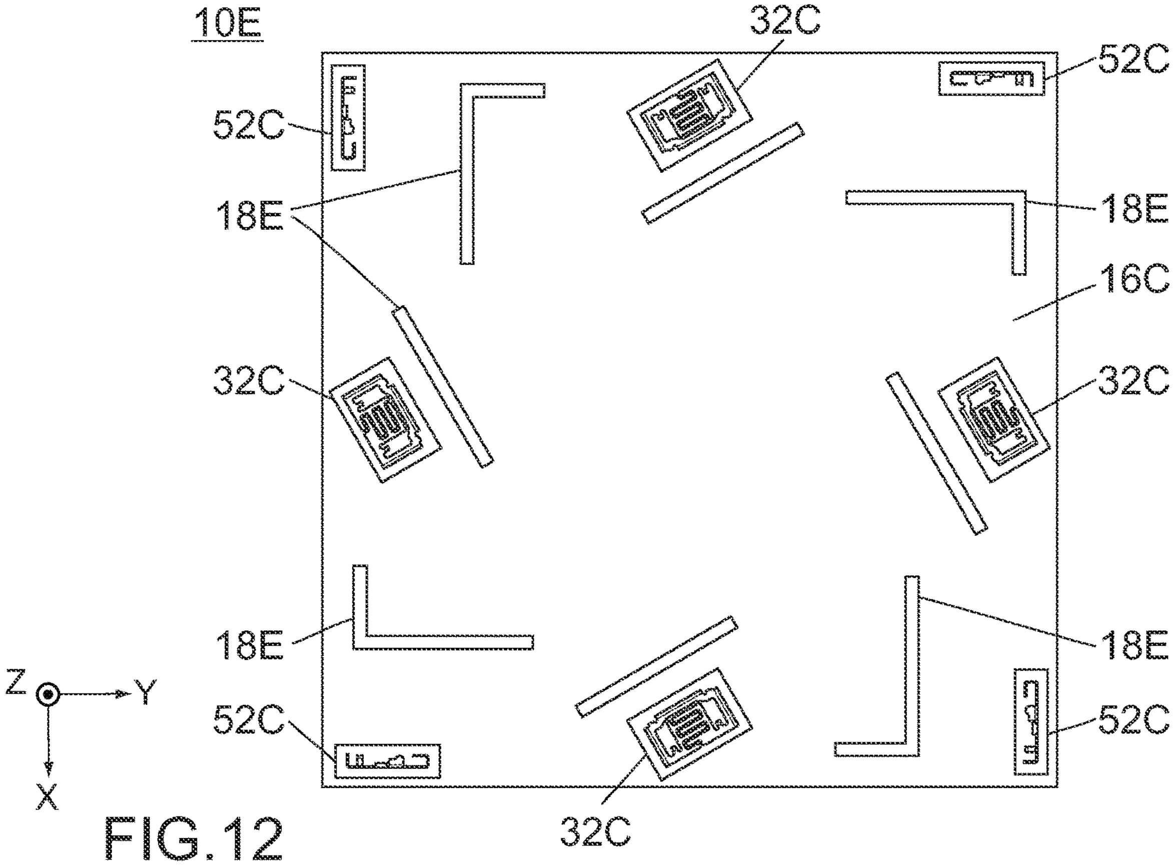
FIG. 12 is a plan view showing another modification of the antenna device of FIG. 9, wherein a support member is not illustrated.

Comparing FIG. 12 with FIG. 11, an antenna device 10E of another modification comprises shield plates 18E different from the shield plates 18D of the antenna device 10D. The arrangement of the first antennas 32C of the antenna device 10E is slightly different from that of the antenna device 10D. Except for the aforementioned differences, the antenna device 10E has a structure similar to that of the antenna device 10D and works similarly to the antenna device 10D. The present modification provides the antenna device 10E whose isolation characteristics can be improved for two types of polarized waves comprising the horizontally polarized wave and the vertically polarized wave.

Referring to FIG. 12, the shield plates 18E of the present modification are indirectly fixed on an upper surface of the reflection plate 16C via the gap members 188D (see FIG. 11) each made of insulator similarly to the shield plates 18D (see FIG. 11). The shield plates 18E extend upward from the reflection plate 16C similarly to the shield plates 18D. Each of the shield plates 18E is located between one of the first antenna 32C and the second antenna 52C which is nearest or close to the one of the first antenna 32C. According to the present modification, two of the shield plates 18E separated from each other are arranged between the first antenna 32C and the second antenna 52C. However, the present invention is not limited thereto. For example, three or more of the shield plates 18E separated from each other may be arranged between the first antenna 32C and the second antenna 52C. Each of the shield plates 18E may be directly fixed on the reflection plate 16C with no gap member 188D.

Figure 13:
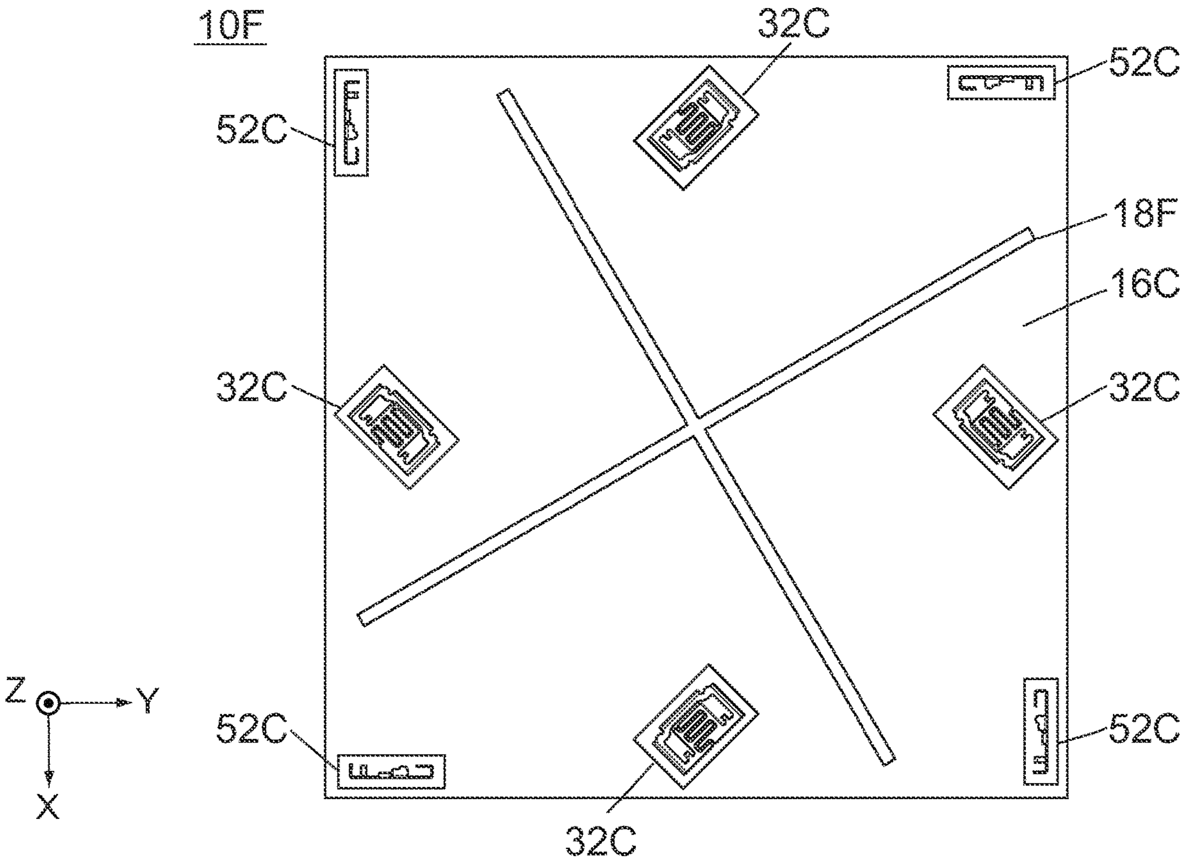
FIG. 13 is a plan view showing still another modification of the antenna device of FIG. 9, wherein a support member is not illustrated.
Figure 14:
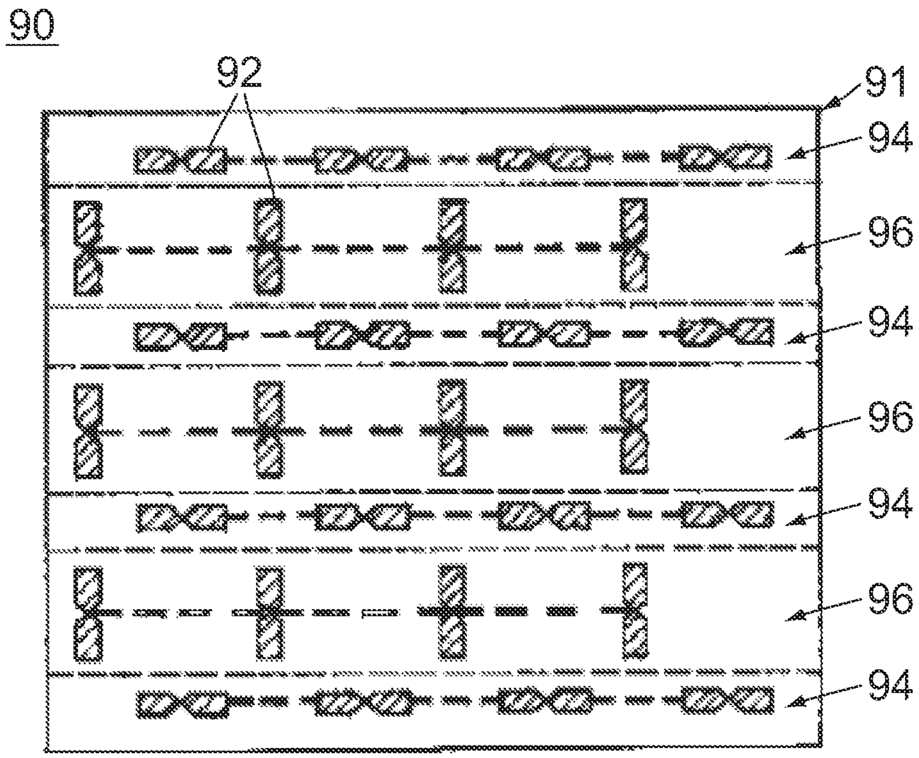
FIG.14 PRIOR ART
FIG. 14 is a plan view showing an antenna device of Patent Document 1.

Comparing FIG. 13 with FIG. 11, an antenna device 10F of a still another modification comprises one shield plate 18F different from the shield plates 18D of the antenna device 10D. The arrangement of the first antennas 32C of the antenna device 10F is slightly different from that of the antenna device 10D. Except for the aforementioned differences, the antenna device 10F has a structure similar to that of the antenna device 10D and works similarly to the antenna device 10D. The present modification provides the antenna device 10F whose isolation characteristics can be improved for two types of polarized waves comprising the horizontally polarized wave and the vertically polarized wave.

Referring to FIG. 13, the shield plate 18F of the present modification is indirectly fixed on an upper surface of the reflection plate 16C via the gap member 188D (see FIG. 11) made of insulator similarly to the shield plates 18D (see FIG. 11). The shield plate 18F extends upward from the reflection plate 16C similarly to the shield plates 18D. The shield plate 18F is located between each of the first antennas 32C and the second antenna 52C which is nearest or close to the each of the first antenna 32C. Thus, the shield plate 18F is located between one of the first antennas 32C and the second antenna 52C which is nearest or close to the one of the first antenna 32C. According to the present modification, the first antenna 32C and the second antenna 52C are separated from each other by the single shield plate 18F. However, the present invention is not limited thereto. For example, the first antenna 32C and the second antenna 52C may be separated from each other by two of the shield plates 18F which are formed separably from each other. Each of the shield plates 18F may be directly fixed on the reflection plate 16C with no gap member 188D.

What is claimed is:

1. An antenna device comprising a plurality of antennas, wherein:

- the antennas include a plurality of first antennas which form a first array and a plurality of second antennas which form a second array;
- the first antennas include two first predetermined antennas;
- a longitudinal direction of one of the first predetermined antennas and another longitudinal direction of a remaining one of the first predetermined antennas intersect with each other and define a horizontal plane;
- each of the first antennas mainly radiates a horizontally polarized wave which is in parallel to the horizontal plane;
- each of the second antennas mainly radiates a vertically polarized wave which is perpendicular to the horizontal plane;
- the second antennas include two second predetermined antennas;
- the two first predetermined antennas are arranged along a first line;
- the two second predetermined antennas are arranged along a second line;
- when the first line and the second line are projected onto the horizontal plane along a direction perpendicular to the horizontal plane, the first line and the second line intersect with each other; and
- when the two first predetermined antennas and the two second predetermined antennas are seen along a direction perpendicular to the horizontal plane, the two first predetermined antennas are located in an imaginary circle with one of the two second predetermined antennas being located at a center of the imaginary circle and a remaining one of the two second predetermined antennas being located on a circumference of the imaginary circle.

2. The antenna device as recited in claim 1, wherein:

one of the two first predetermined antennas is located between the two second predetermined antennas when seen along a direction which is perpendicular to the second line and is in parallel to the horizontal plane; and one of the two second predetermined antennas is located between the two first predetermined antennas when seen along a direction which is perpendicular to the first line and is in parallel to the horizontal plane.

3. The antenna device as recited in claim 1, wherein:

two of the first antennas, which are adjacent to each other in the first array, are arranged to have different orientations; and two of the second antennas, which are adjacent to each other in the second array, are arranged to have different orientations.

4. The antenna device as recited in claim 1, wherein:

the antenna device comprises a reflection plate;

the reflection plate is arranged along the horizontal plane; and each of the second antennas is, at least in part, located between the first array and the reflection plate in a direction perpendicular to the horizontal plane.

5. The antenna device as recited in claim 1, wherein:

the antenna device comprises one or more shield plates; and each of the shield plates is located between one of the first antennas and the second antenna which is close to the one of the first antennas.

6. The antenna device as recited in claim 1, wherein at least one of the first array and the second array includes at least three of the antennas which are arranged on a plane in parallel to the horizontal plane.

7. The antenna device as recited in claim 1, wherein:

the first antennas are arranged on a plane in parallel to the horizontal plane; and the second antennas are arranged on a plane in parallel to the horizontal plane.

8. The antenna device as recited in claim 1, wherein each of the antennas of one of the first array and the second array is located between two of the antennas which are included in a remaining one of the first array and the second array and are adjacent to each other.

9. The antenna device as recited in claim 1, wherein a predetermined line which extends along the longitudinal direction of one of the two first predetermined antennas intersects with a remaining one of the two first predetermined antennas.

10. The antenna device as recited in claim 1, wherein:

the first array includes four of the first antennas;

the four of the first antennas are arranged at four corners of an imaginary first rectangle, respectively;

the imaginary first rectangle is located on a plane in parallel to the horizontal plane;

the second array includes four of the second antennas;

the four of the second antennas are arranged at four corners of an imaginary second rectangle, respectively;

the imaginary second rectangle is located on a plane in parallel to the horizontal plane;

each of four sides of the first rectangle is nearer to two sides among four sides of the second rectangle than to remaining two sides of the second rectangle; and a direction along which each of the four sides of the first rectangle extends intersects with both of directions along which the nearer two sides of the second rectangle extend, respectively.

11. An antenna device comprising a plurality of antennas, wherein:

the antennas include a plurality of first antennas which form a first array and a plurality of second antennas which form a second array;

the first antennas include two first predetermined antennas;

a longitudinal direction of one of the first predetermined antennas and another longitudinal direction of a remaining one of the first predetermined antennas intersect with each other and define a horizontal plane;

each of the first antennas mainly radiates a horizontally polarized wave which is in parallel to the horizontal plane;

each of the second antennas mainly radiates a vertically polarized wave which is perpendicular to the horizontal plane;

the second antennas include two second predetermined antennas;

the two first predetermined antennas are arranged along a first line;

the two second predetermined antennas are arranged along a second line;

when the first line and the second line are projected onto the horizontal plane along a direction perpendicular to the horizontal plane, the first line and the second line intersect with each other;

each of the first antennas is an antenna which has a split-ring resonance structure; and each of the second antennas is an antenna which has a split-ring resonance structure.

* * * * *